(12) United States Patent
Suzuki

(10) Patent No.: US 6,739,299 B2
(45) Date of Patent: May 25, 2004

(54) CRANKING-CAUSED VIBRATION SUPPRESSING APPARATUS AND METHOD FOR INTERNAL COMBUSTION ENGINE

(75) Inventor: Takashi Suzuki, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 210 days.

(21) Appl. No.: 09/987,411

(22) Filed: Nov. 14, 2001

(65) Prior Publication Data

US 2002/0062806 A1 May 30, 2002

(30) Foreign Application Priority Data

Nov. 27, 2000 (JP) .......................... 2000-358905

(51) Int. Cl.[7] .............................................. F02N 11/00
(52) U.S. Cl. .................................. 123/179.3; 123/192.1
(58) Field of Search ..................... 123/179.3, 179.4, 123/179.25, 192.1

(56) References Cited

U.S. PATENT DOCUMENTS

| | | | |
|---|---|---|---|
| 4,699,097 A | * 10/1987 | Tanaka et al. | 123/192.1 |
| 5,033,425 A | * 7/1991 | Kadomukai et al. | 123/192.1 |
| 5,495,127 A | 2/1996 | Aota et al. | |
| 5,722,359 A | 3/1998 | Chibachi et al. | |
| 6,018,198 A | 1/2000 | Tsuzuki et al. | |
| 6,286,473 B1 | * 9/2001 | Zaremba | 123/192.1 |
| 6,405,701 B1 | * 6/2002 | Masberg et al. | 123/192.1 |
| 6,543,561 B1 | 4/2003 | Pels et al. | |
| 2002/0152980 A1 | * 10/2002 | Ahner et al. | 123/179.3 |

FOREIGN PATENT DOCUMENTS

| | | |
|---|---|---|
| DE | 32 30 607 A1 | 2/1984 |
| DE | 198 17 497 A1 | 10/1999 |
| JP | A 9-195812 | 7/1997 |
| JP | A 10-212983 | 8/1998 |
| JP | A-11-82261 | 3/1999 |
| JP | A-11-113220 | 4/1999 |
| JP | 11-336581 | 12/1999 |
| JP | A-11-336581 | 12/1999 |
| JP | A-2000-115911 | 4/2000 |
| JP | 2000-115911 | 4/2000 |
| JP | A-2002-510007 | 4/2002 |

* cited by examiner

Primary Examiner—Henry C. Yuen
Assistant Examiner—Arnold Castro
(74) Attorney, Agent, or Firm—Oliff & Berridge, PLC

(57) ABSTRACT

At the time of (i.e., during) cranking of an internal combustion engine, an engine cranking-caused vibration suppressing apparatus and method controls the operation of an electric motor that cranks the internal combustion engine based on the rotational phase of the crankshaft detected by a crankshaft rotational phase detector so that the output torque of the motor fluctuates similarly to fluctuations in resistance torque against the cranking of the engine that the crankshaft presents in accordance with the rotational phase thereof. Thus, the apparatus and method are able to suppress vibrations during the cranking of the engine, leading to improvements in the riding comfort and the noise suppression of a vehicle.

10 Claims, 4 Drawing Sheets

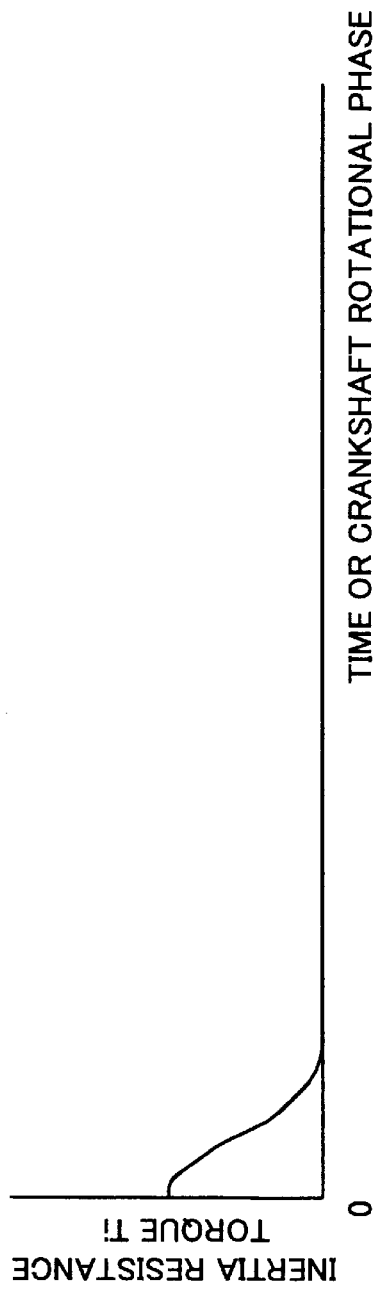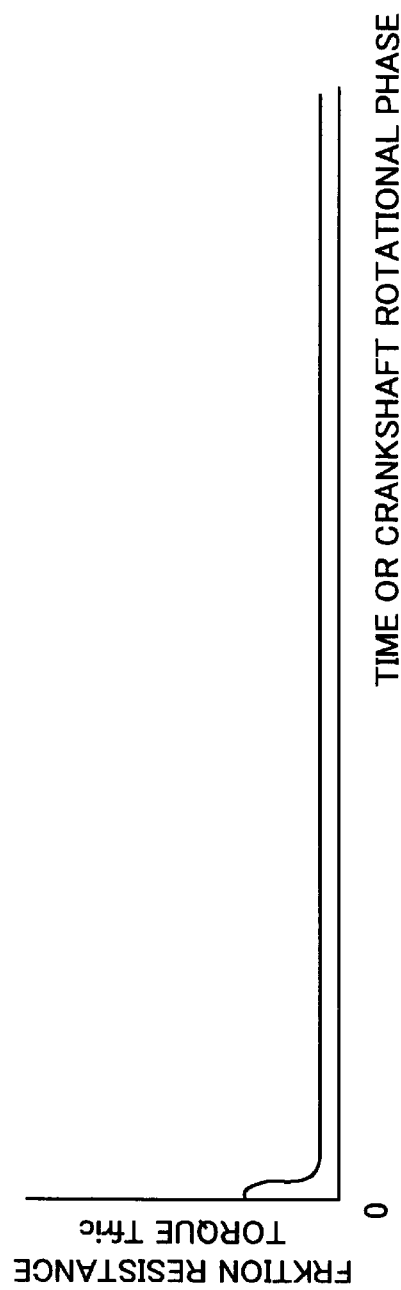

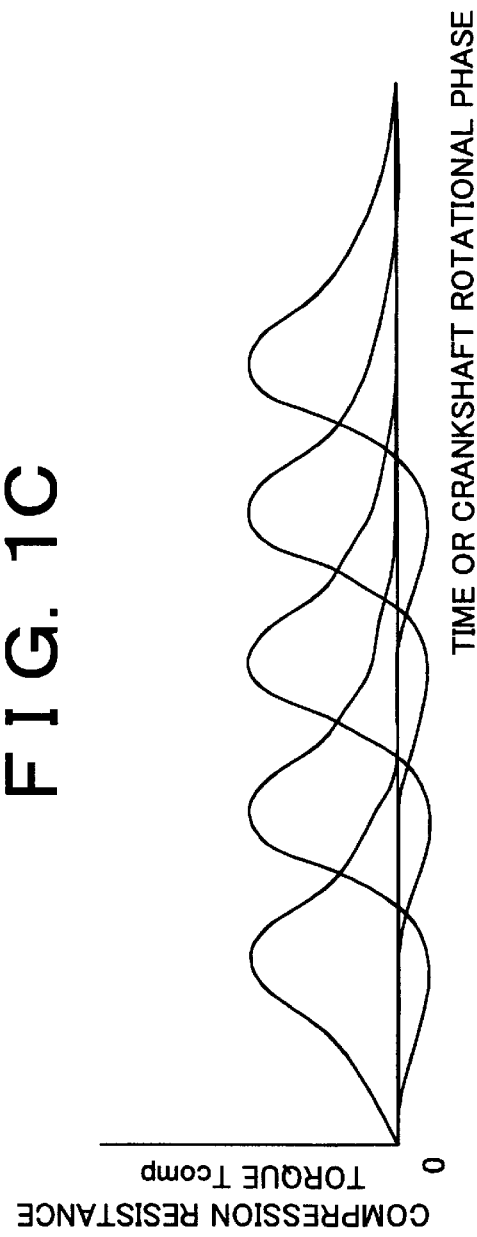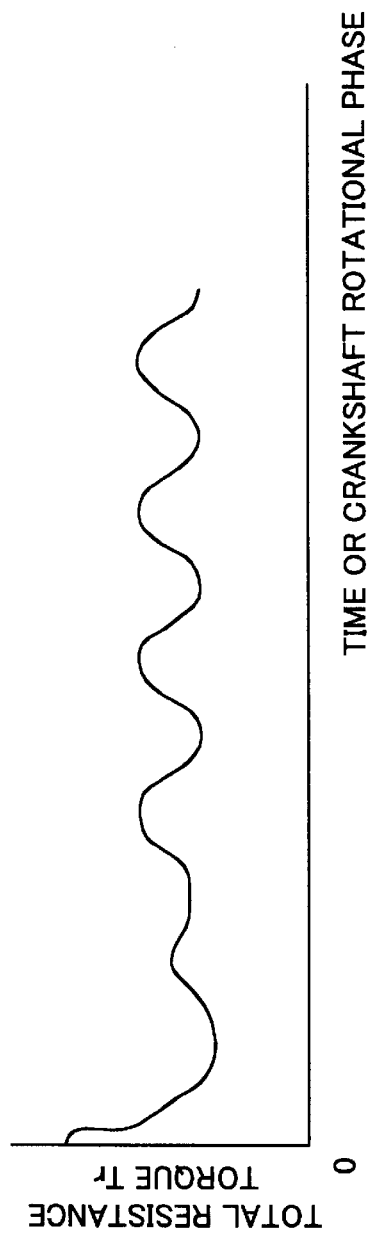

CRANKING-CAUSED VIBRATION SUPPRESSING APPARATUS AND METHOD FOR INTERNAL COMBUSTION ENGINE

INCORPORATION BY REFERENCE

The disclosure of Japanese Patent Application No. 2000-358905 filed on Nov. 27, 2000, including the specification, drawings and abstract is incorporated herein by reference in its entirety.

BACKGROUND OF THE INVENTION

1. Field of Invention

The invention relates to apparatus and methods for suppressing vibrations of an internal combustion engine caused by the cranking of the engine.

2. Description of Related Art

A reciprocating piston engine, that is, a type of internal combustion engine, is started by a cranking operation of turning a crankshaft of the engine via an electric motor. Conventionally, substantially no technical attention has been given to vibrations caused at the time of the cranking of the engine, more precisely, during the cranking thereof. With regard to the vibrations at the time of a start of an engine, Japanese Patent Application Laid-Open No. 10-212983 describes an arrangement in which an engine is cranked by a first electric motor, and at the instant when the engine starts combustion revolution, a drive torque of a second electric motor is applied in a direction opposite to the direction of the drive torque of the first electric motor so as to suppress vibrations caused by sharp changes in torque at the time of the start of combustion revolution. However, this vibration suppressing measure is concerned with vibrations occurring after the cranking ends, and is not concerned with vibrations occurring during the cranking.

In relation to the operation of a vehicle run by a reciprocating piston engine, such as a motor vehicle or the like, a general idea is that the cranking of the engine is performed only at the initiation of each operation of the vehicle, and that once the engine is started, the cranking of the engine is no longer needed as long the engine normally operates, regardless of how long the vehicle continues to be in operation.

However, due to recent needs for fuel resource conservation and environmental protection, great attention has been drawn to fuel-saving vehicles that temporarily stop the engine at the time of temporary vehicle stops for traffic signals or in traffic jams or at the time of slow runs (i.e., slow-speed movement) in heavy traffic during operation of the vehicle. In addition, it is known to provide hybrid vehicles that utilize engine drive and electric motor drive in appropriate combinations in accordance with the state of vehicle running, etc. In the fuel-saving motor vehicles and the hybrid vehicles, the engine is stopped and restarted at various occasions during an operation of the vehicle. Therefore, for further improved noise suppression of such a vehicle, the vibrations of the engine associated with the cranking of the engine need to be suppressed not only after the cranking (as in the aforementioned laid-open patent application), but also during the cranking. However, in the engine described in the aforementioned Japanese Patent Application Laid-Open No. 10-212983, no provision is made for suppressing vibrations that occur during the cranking.

SUMMARY OF THE INVENTION

Accordingly, it is one object of the invention to provide a cranking-caused vibration suppressing apparatus and method for an internal combustion engine that copes with the problem of vibrations occurring during the cranking of the engine, which is expected to greatly affect the riding comfort and the noise suppression of a vehicle in terms of timing and rate of occurrence of the vibrations.

In order to achieve the aforementioned and/or other objects, one aspect of the invention provides a vibration suppressing apparatus for suppressing a vibration of an internal combustion engine caused by a cranking of the internal combustion engine performed by a motor. The vibration suppressing apparatus includes a rotational phase detector that detects a rotational phase of a crankshaft of the internal combustion engine, and a controller that controls an operation of the motor (that cranks the engine) based on the rotational phase of the crankshaft detected by the rotational phase detector so that an output torque of the motor fluctuates similarly to a fluctuation in a resistance torque against the cranking of the internal combustion engine that the crankshaft presents in accordance with the rotational phase of the crankshaft. The fluctuation in the resistance torque includes at least a fluctuation in a resistance torque caused by compression of an intake air.

Another aspect of the invention provides a vibration suppressing method for suppressing a vibration of an internal combustion engine caused by a cranking of the internal combustion engine performed by a motor. In this method, a rotational phase of a crankshaft of the internal combustion engine is detected. On the basis of the detected rotational phase of the crankshaft, an operation of the motor is controlled so that an output torque of the motor fluctuates similarly to a fluctuation in a resistance torque against the cranking of the internal combustion engine that the crankshaft presents in accordance with the rotational phase of the crankshaft. The fluctuation in the resistance torque includes at least a fluctuation in a resistance torque caused by compression of an intake air.

In the vibration suppressing apparatus and method described above, the operation of the motor is controlled on the basis of the detected crankshaft rotational phase so that the output torque of the motor fluctuates similarly to a fluctuation in the resistance torque against the cranking of the engine presented by the crankshaft in accordance with the rotational phase thereof, the fluctuation in the resistance torque including at least the fluctuation in the resistance torque caused by intake air compression. Therefore, the motor produces an output torque corresponding to fluctuations in the resistance torque occurring on the crankshaft of the internal combustion engine. That is, the motor produces great output torque when the resistance torque is great, and produces small output torque when the resistance torque is small. As a result, vibrations of the engine are suppressed at the time of the cranking of the engine. Hence, the invention improves the riding comfort and the noise suppression during the engine cranking in a vehicle equipped with the above-described engine.

BRIEF DESCRIPTION OF THE DRAWINGS

The above and other objects, features, advantages, technical and industrial significance of this invention will be better understood by reading the following detailed description of preferred embodiments of the invention, when considered in connection with the accompanying drawings, in which:

FIG. 1A is a graph indicating inertia resistance torque presented by a crankshaft during the cranking of a multi-cylinder reciprocating piston engine;

FIG. 1B is a graph indicating friction resistance torque presented by the crankshaft during the cranking of the multi-cylinder reciprocating piston engine;

FIG. 1C is a graph indicating compression resistance torque presented by the crankshaft during the cranking of the multi-cylinder reciprocating piston engine;

FIG. 1D is a graph indicating total resistance torque presented by the crankshaft during the cranking of the multi-cylinder reciprocating piston engine;

DETAILED DESCRIPTION OF PREFERRED EMBODIMENTS

In the following description and the accompanying drawings, the present invention will be described in more detail in terms of exemplary preferred embodiments.

Figure 2:
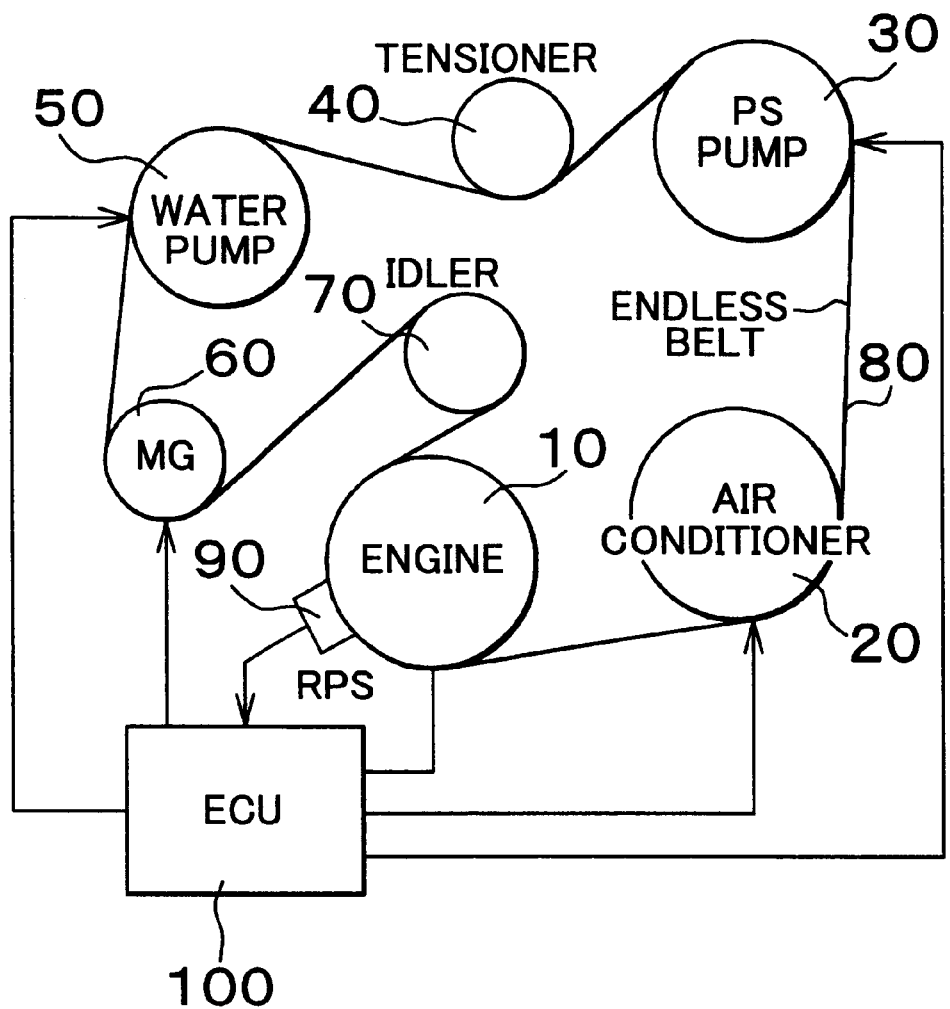
FIG. 2 is a diagram illustrating a power system of a hybrid vehicle to which a cranking-caused vibration suppressing apparatus and method in accordance with the invention is applied.

FIG. 2 is a diagram illustrating a power system of a hybrid vehicle to which a vibration suppressing apparatus in accordance with the invention is applied. A reciprocating piston engine 10, that is, a type of internal combustion engine, drives wheels (not shown) via an output shaft of the engine 10, and also drives an air conditioner 20, a power steering pump (PS pump) 30 and a water pump 50, via an endless belt 80 that is disposed and turned around the output shaft of the engine 10, the air conditioner 20, the power steering pump 30, a tensioner 40, the water pump 50, a motor-generator (MG) 60 and an idler 70. When a battery device (not shown) is to be charged, the motor-generator 60 is operated as a generator. The motor-generator 60 also may operate as an electric motor. When the engine 10 is to be started, the motor-generator 60 operates as a motor and cranks the engine 10 to start the engine. When the vehicle is to be electrically run, the motor-generator 60 operates as a motor and entirely replaces the engine 10 to drive the wheels. When drive power is to be produced to assist the engine 10 during operation of the engine 10, the motor-generator 60 operates as a motor and drives the wheels in cooperation with the engine 10.

The output shaft (crankshaft) of the engine 10 is provided with a rotational phase sensor (RPS) 90 for detecting the rotational phase of the output shaft. A signal indicating the rotational phase of the engine crankshaft detected by the sensor 90 is supplied to an electronic vehicle operation control unit (ECU) 100 that incorporates a computer. At the time of the engine cranking, the electronic vehicle operation control unit (ECU) 100 causes the motor-generator 60 to operate as an electric motor based on the signal sent from the rotational phase sensor (RPS) 90. From the instant of the start of cranking, the rotational phase sensor (RPS) 90 causes the motor-generator 60 to drive the crankshaft with an output torque Tmg that exhibits the same changes as a total resistance torque Tr indicated in FIG. 1D (described in detail below), in correspondence to the rotational phase of the crankshaft. As for the changes in the output torque Tmg as indicated in FIG. 1D, it is preferable that a correction against a compression resistance torque Tcomp be made in accordance with the fact that the actual amount of intake air changes depending on the atmospheric temperature. The engine 10 in this embodiment is a four-cylinder engine. The compression resistance torque Tcomp exemplified in FIG. 1C commences exactly at a point at which one of the pistons of the four-cylinder engine comes to a top dead center at which the intake stroke starts. However, it is easy to correct the waveform of the total resistance torque Tr occurring at the beginning of the cranking in accordance with the crank rotational phase at the beginning of the cranking. Furthermore, phase alignment may be performed by operating the electric motor during a temporary stop of the engine so that the rotational phase of the crankshaft at the beginning of the cranking is always a predetermined phase. The alignment of the rotational phase of the crankshaft can be accomplished by the electronic vehicle operation control unit (ECU) 100 causing a micro-operation of the motor-generator 60 while referring to the signal from the rotational phase sensor (RPS) 90.

Although the engine 10 in this embodiment is a four-cylinder engine, the number of cylinders of the engine is not limited to four, but may also be six or eight. The invention is also applicable to engines having still different number of cylinders.

The total resistance torque Tr exemplified in FIG. 1D substantially equals the cranking torque on the engine 10. The cranking torque is based on torque obtained by mapping an inertia resistance torque Ti that is based on the inertia presented by the engine 10 at the time of the cranking of the engine 10, in particular, at the very beginning of an initial period of the cranking, on an assumption that the inertia resistance torque Ti changes with respect to time or the rotational phase of the crankshaft as exemplified in FIG. 1A based on the design specifications of the engine 10 and the design specifications of an engine starter motor, such as the motor-generator 60.

However, instead of mapping the inertia of the engine 10 as the inertia resistance torque Ti, it is possible to map the inertia of the engine 10 so that the rising change in the rotation speed of the crankshaft caused by cranking the engine 10 occurs in a predetermined fashion.

That is, the inertia resistance torque Ti (=Ie(dωe/dt)) can be expressed as in the following mathematical expression 1:

$$Ie(d\omega e/dt) = Tmg - Tfric - Tcomp \qquad (1)$$

where ωe is the angular speed of the rotation of the crankshaft; Ie is a rotation inertia moment of the engine that acts on the crankshaft; Tmg is the drive torque from the motor-generator 60 that acts on the crankshaft; Tfric is a friction resistance torque of the engine; and Tcomp is the compression resistance torque.

Therefore, the following expression 2 can be obtained:

$$Tmg = Ie(d\omega e/dt) + Tfric + Tcomp \qquad (2)$$

Figure 3:
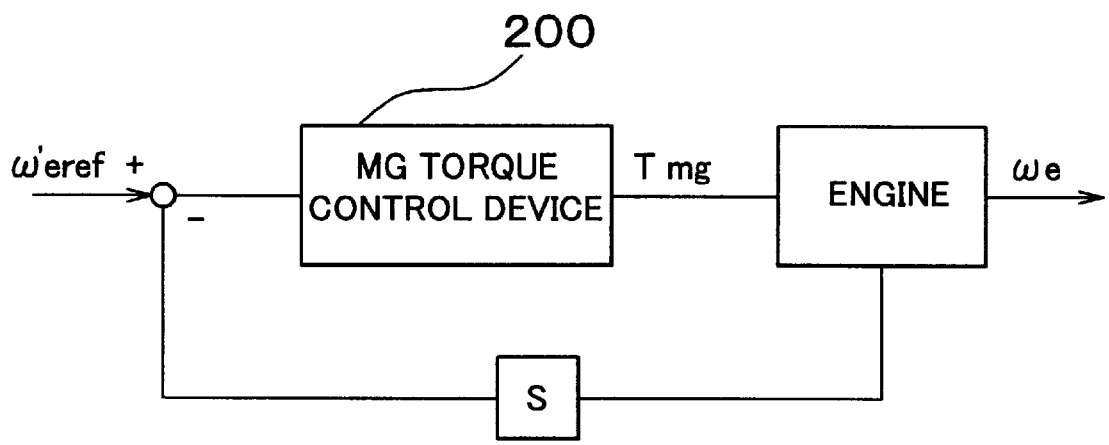
FIG. 3 is a block diagram showing one example of a control circuit incorporated into an electronic vehicle operation control unit (ECU) shown in FIG. 2.

Hence, in order to achieve a desired fashion of the rising change in the rotation speed of the crankshaft caused by the cranking, it is appropriate to control the drive torque Tmg from the motor-generator 60 so that dωe/dt, that is, the rate of change in the crankshaft rotation angular speed ωe (i.e., the rotation angular acceleration), changes in a desired transition pattern. To that end, a control circuit as shown in FIG. 3 may be incorporated into the electronic vehicle operation control unit (ECU) 100 shown in FIG. 2. In FIG. 3, a block S indicates a differentiator device. The crankshaft rotation angular speed ωe is obtained as a rate of change of the output of the rotational phase sensor (RPS) 90. The rotation angular acceleration dωe/dt may be replaced by dωe/dθ where θ is the crankshaft rotational phase.

Referring to FIG. 3, a rotation angular acceleration reference value (dωe/dt)ref is a signal that indicates a desired fashion of the rising change in the crankshaft rotation speed, and is read from a map (not shown) so that the crankshaft rotation speed is raised with respect to time or the crankshaft rotational phase in accordance with a desired schedule. Naturally, it is preferable that the rotation speed of the crankshaft at the time of cranking be raised as rapidly as possible on condition that no impact is given to the surrounding, and after being raised, the crankshaft rotation speed be kept constant. Therefore, the rotation angular acceleration reference value $(d\omega e/dt)ref$ is set so as to have a time-based change characteristic similar to that of the inertia resistance torque Ti indicated in FIG. 1A.

In a multi-cylinder engine, a plurality of pistons are connected to the crankshaft via plural sets of cranks and piston rods. When these members formed by metal masses start to move, corresponding amounts of inertia resistance occur at the instant of initiation of movements. Therefore, at the beginning of rotation of the crankshaft, an inertia resistance acts corresponding to the inertia resistances of the members. Furthermore, the moving contact portions of the engine, particularly, contact portions of the pistons and the cylinder inner wall surfaces, are lubricated, and therefore are in an adhered state due to lubricating oil when the pistons are still. Hence, at the instant of starting the engine, considerable static friction resistance occurs. Even after motion starts, the moving contact portions produce a certain amount of dynamic friction resistance, which appears as a resistance against the rotation of the crankshaft. Furthermore, the intake air drawn into each cylinder during the intake stroke thereof is compressed during the subsequent compression stroke, so that compression reaction force acts on the piston. Thus, the crankshaft receives a rotation resistance due to the compression of intake air. Although ignition is performed in compressed intake air, combustion does not occur due to the delay in supply of fuel during the initial one or two rotations of the crankshaft, regardless of whether the engine is of a carburetor type or an injection type. Therefore, during the initial one or two rotations of the crankshaft, no engine output is produced. These types of resistance torques act on the crankshaft generally as indicated in FIGS. 1A, 1B and 1C.

The change characteristic of the inertia resistance torque Ti with respect to time or the crankshaft rotational phase varies depending on the acceleration that occurs at the beginning of the cranking of the engine 10 via the engine-starting motor-generator 60. Therefore, the change characteristic of the inertia resistance torque Ti can be changed through the control of the output torque Tmg of the motor-generator 60. The change characteristic of the friction resistance torque Tfric with respect to time or the crankshaft rotational phase varies depending on changes in the state of lubrication between the cylinder wall and the piston in each cylinder in accordance with the engine temperature at the time of the cranking and the elapsed time following the stop of the engine. Generally, the friction resistance torque Tfric initially assumes relatively high values due to the static friction, and then assumes a substantially constant value due to the dynamic friction as indicated in FIG. 1B. The change characteristic of the compression resistance torque Tcomp with respect to time or the crankshaft rotational phase is generally as indicated in FIG. 1C during repeated compressions of intake air without combustion in the cylinders of the engine 10. However, in a minute aspect, the change characteristic thereof varies depending on the open-closure phase of the intake valves. FIG. 1C indicates a change characteristic of the compression resistance torque Tcomp exhibited in a condition that at the time of starting the engine, one of the pistons is exactly at the top dead center at which the intake stroke starts.

The crankshaft receives a total resistance torque Tr, that is, a whole sum of the resistance torques that act on the crankshaft. The total resistance torque Tr fluctuates with respect to time or the crankshaft rotational phase as indicated by the graph of the total resistance torque Tr in FIG. 1D. Therefore, if the crankshaft, which presents the resistance torque that fluctuates as mentioned above, is driven by an electric motor that produces a uniform torque output as in the conventional art, the engine 10, which is elastically supported on a vehicle body, vibrates around the crankshaft in accordance with the fluctuations in the cranking torque (total resistance torque) presented by the crankshaft. However, taking it into consideration that the crankshaft presents the above-described fluctuations in the resistance torque against the craning performed by the motor-generator 60, it is appropriate to make a pre-setting such that the output torque Tmg of the motor-generator 60 fluctuates based on the crankshaft rotational phase, in imitation of the fluctuations in the total resistance torque Tr as mentioned above. This setting will suppress vibrations of the engine caused by the aforementioned fluctuations in the resistance torque during the cranking. The motor-generator 60 can be caused to produce the drive torque that fluctuates as indicated in FIG. 1D, through the operation control of the motor-generator 60 performed by using a computer.

In the illustrated embodiment, a controller (ECU 100) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vibration suppressing apparatus for suppressing a vibration of an internal combustion engine caused by a cranking of the internal combustion engine performed by a motor, comprising:

a rotational phase detector that detects a rotational phase of a crankshaft of the internal combustion engine; and a controller that controls an operation of the motor based on the detected rotational phase of the crankshaft detected by the rotational phase detector so that an output torque of the motor fluctuates during the cranking similarly to a fluctuation in a resistance torque against the cranking of the internal combustion engine that the crankshaft presents in accordance with the rotational phase of the crankshaft, the fluctuation in the resistance torque including at least a fluctuation in a resistance torque caused by compression of an intake air by the internal combustion engine, wherein the controller estimates the fluctuation in the resistance torque against the cranking of the internal combustion engine that the crankshaft presents in accordance with the rotational phase of the crankshaft, and the controller adjusts the rotational phase of the crankshaft occuring at a beginning of the cranking to a predetermined phase.

2. The vibration suppressing apparatus according to claim 1, wherein the fluctuation in the resistance torque compensated for by the controller further includes a fluctuation in an internal combustion engine inertia resistance torque exerted on the crankshaft presents in accordance with the rotational phase of the crankshaft.

3. The vibration suppressing apparatus according to claim 2, wherein the fluctuation in the resistance torque compensated for by the controller further includes a fluctuation in an internal combustion engine friction resistance torque exerted on the crankshaft against the cranking of the internal combustion engine that the crankshaft presents in accordance with the rotational phase of the crankshaft.

4. The vibration suppressing apparatus according to claim 1, wherein the fluctuation in the resistance torque compensated for by the controller further includes a fluctuation in an internal combustion engine friction resistance torque exerted on the crankshaft against the cranking of the internal combustion engine that the crankshaft presents in accordance with the rotational phase of the crankshaft.

5. The vibration suppressing apparatus according to claim 1, wherein the controller controls the operation of the motor so that a rotation angular acceleration of the crankshaft with respect to the rotational phase of the crankshaft follows a predetermined schedule.

6. A method for suppressing a vibration of an internal combustion engine caused by a cranking of the internal combustion engine performed by a motor, comprising:

detecting a rotational phase of a crankshaft of the internal combustion engine;

controlling an operation of the motor, based on the detected rotational phase of the crankshaft, so that an output torque of the motor fluctuates during the cranking similarly to a fluctuation in a resistance torque against the cranking of the internal combustion engine that the crankshaft presents in accordance with the rotational phase of the crankshaft, the fluctuation in the resistance torque including at least a fluctuation in a resistance torque caused by compression of an intake air by the internal combustion engine;

adjusting the rotational phase of the crankshaft occuring at a beginning of the cranking to a predetermined phase, wherein the fluctuation in the resistance torque against the cranking of the internal combustion engine that the crankshaft presents in accordance with the rotational phase of the crankshaft is determined by an estimation.

7. The method according to claim 6, wherein the fluctuation in the resistance torque also includes a fluctuation in an internal combustion engine inertia resistance torque exerted on the crankshaft against the cranking of the internal combustion engine that the crankshaft presents in accordance with the rotational phase of the crankshaft.

8. The method according to claim 7, wherein the fluctuation in the resistance torque also includes a fluctuation in an internal combustion engine friction resistance torque exerted on the crankshaft against the cranking of the internal combustion engine that the crankshaft presents in accordance with the rotational phase of the crankshaft.

9. The method according to claim 6, wherein the fluctuation in the resistance torque also includes a fluctuation in an internal combustion engine friction resistance torque exerted on the crankshaft against the cranking of the internal combustion engine that the crankshaft presents in accordance with the rotational phase of the crankshaft.

10. The method according to claim 6, further comprising:

detecting a rotation angular accleration of the crankshaft with respect to the rotational phase of the crankshaft; and controlling the operation of the motor so that the rotation angular accleration follows a predetermined schedule.

* * * * *